United States Patent
Berger et al.

(10) Patent No.: US 6,944,037 B2
(45) Date of Patent: Sep. 13, 2005

(54) METHOD AND VOLTAGE CONVERTER FOR CONVERTING DC INPUT VOLTAGE TO AC VOLTAGE IN A SYSTEM FREQUENCY RANGE

(75) Inventors: Erik Berger, Vienna (AT); Martin Eisner, Weigelsdorf (AT); Martin Meschik, Vienna (AT); Navid Rahmanian-Shahri, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/682,534

(22) Filed: Oct. 10, 2003

(65) Prior Publication Data

US 2004/0130917 A1 Jul. 8, 2004

Related U.S. Application Data

(63) Continuation of application No. PCT/EP02/03801, filed on Apr. 5, 2002.

(30) Foreign Application Priority Data

Apr. 10, 2001 (EP) .......................................... 01108951

(51) Int. Cl.$^7$ ................................................ H02M 7/44
(52) U.S. Cl. ........................................ 363/98; 363/132
(58) Field of Search ...................... 363/98, 132, 24–26, 363/34, 37, 40, 47, 89, 125, 126, 127, 131, 133, 134

(56) References Cited

U.S. PATENT DOCUMENTS

| | | | |
|---|---|---|---|
| 3,517,300 A | * | 6/1970 | McMurray .................. 363/25 |
| 4,339,791 A | | 7/1982 | Mitchell |
| 4,348,719 A | | 9/1982 | Hicks et al. |
| 4,399,499 A | | 8/1983 | Butcher et al. |
| 4,479,175 A | | 10/1984 | Gille et al. |
| 4,706,177 A | * | 11/1987 | Josephson .................... 363/24 |
| 5,381,327 A | * | 1/1995 | Yan ............................. 363/24 |
| 5,657,220 A | * | 8/1997 | Yan ........................... 363/132 |
| 5,907,223 A | * | 5/1999 | Gu et al. .................... 315/247 |
| 6,094,363 A | | 7/2000 | Cheng |
| 6,151,234 A | * | 11/2000 | Oldenkamp ................. 363/132 |

FOREIGN PATENT DOCUMENTS

| | | |
|---|---|---|
| DE | 42 43 205 A1 | 10/1993 |
| EP | 0 293 869 A2 | 12/1988 |
| EP | 0 309 919 A2 | 4/1989 |
| EP | 0 475 345 A2 | 3/1992 |
| EP | 1 039 622 A1 | 9/2000 |
| GB | 2 087 171 A | 5/1982 |

* cited by examiner

*Primary Examiner*—Gary L Laxton
(74) *Attorney, Agent, or Firm*—Sughrue Mion, PLLC

(57) ABSTRACT

A method and apparatus for generating an AC voltage in a system frequency range from a DC input voltage. Two opposite-pole, pulse-width modulated (PWM) rectangular pulses having a high switching rate are applied to the primary winding of a transformer. Every pulse is modulated to correspond to a half-wave of the AC voltage to be generated. On the secondary side of the transformer, the impulses of both PWM pulse trains are rectified to create a pulse train of a single polarity, the pulse width modulation of which corresponds to subsequent half-waves of the AC voltage to be generated. The pulse train so obtained is periodically commutated at double the frequency of the AC voltage to be generated so that a PWM signal representative of the AC output voltage is obtained with respect to amplitude, frequency, and polarity.

13 Claims, 3 Drawing Sheets

METHOD AND VOLTAGE CONVERTER FOR CONVERTING DC INPUT VOLTAGE TO AC VOLTAGE IN A SYSTEM FREQUENCY RANGE

This is a Continuation of International Application PCT/EP02/03801, with an international filing date of Apr. 5, 2002, which was published under PCT Article 21(2) in German, and the disclosure of which is incorporated into this application by reference.

FIELD OF AND BACKGROUND OF THE INVENTION

The invention relates to a method for generating an AC voltage in a system frequency range from a DC input voltage in which the DC input voltage, pulse-width modulated, is connected to the primary winding of a transformer at a higher switching frequency than the system frequency.

The invention also relates to a voltage converter for converting a DC input voltage to an AC output voltage in the system frequency range using a transformer. Selectively connected to a primary winding of the transformer is the DC input voltage, pulse-width modulated via a switching device which is driven by a drive circuit at a higher switching frequency than the system frequency.

In order to generate an AC voltage in the system frequency range, for example 117 V/60 Hz or 230 V/50 Hz, from a DC input voltage of, for example, 12 or 24 V, two stages are usually carried out according to the prior art, for example as explained below:

In a first stage, an intermediate circuit voltage of 310 V is generated by means of a step-up converter from the low DC input voltage of 12 V. A flyback converter or forward converter is used for this purpose, using pulse-width modulation in a frequency range above the audible range, for example 20 kHz or more. The intermediate circuit voltage is regulated to ensure that it is constant. This high DC voltage is then converted by means of a full bridge rectifier to obtain the desired AC voltage, pulse-width modulation again being used at a switching frequency of 20 kHz or more. The envelope of the stepped voltage obtained here forms the system frequency output voltage. It is clear to those skilled in the art that this two-stage method necessarily leads to greater losses and decreased efficiency. Inductors are required in both converter stages, a transformer being required in at least one stage in order to provide the DC isolation that is usually required between the input and the output. These inductors and the required intermediate circuit capacitor are disadvantageous in terms of costs.

If the DC input voltage of, for example, 12 V is converted directly to a 50 Hz voltage then this requires an expensive 50 Hz transformer to achieve the desired 117/230 V on the output side.

OBJECTS OF THE INVENTION

One object of the invention is to provide a method and a voltage converter with which the overall complexity is reduced and with which no transformers operable at the system frequency are required.

SUMMARY OF THE INVENTION

This object is achieved with a method of the type mentioned initially in which, according to the invention, two pulse-width modulated square-wave pulse trains of opposite polarity are applied to the primary winding. Each pulse train is modulated so as to correspond to one half-cycle of the AC voltage to be generated. The pulses of the pulse train in each case are shifted with respect to pulses of the other pulse train such that the pulses of one pulse train fall into the gaps in the other pulse train. The pulses of the two pulse trains are rectified on the secondary side of the transformer such that only one pulse train of pulses of one polarity is still present. Owing to their pulse-width modulation, these pulses correspond to successive half-cycles of the AC voltage to be generated. The polarity of the pulse train obtained after rectification is reversed periodically at double the frequency of the AC voltage to be generated such that a pulse train is obtained which is a pulse-width modulated representation of the AC output voltage with respect to amplitude, frequency and polarity.

The invention dispenses with a complex high-voltage intermediate circuit having an expensive intermediate circuit capacitor. Since the switch-over is carried out on the secondary side in the system frequency range, the required switching elements are dimensioned with respect to these low frequencies.

In some cases it may be necessary or expedient to subject the pulse train obtained to low-pass filtering in order to obtain the AC output voltage (e.g., a sinusoid).

In a preferred embodiment of the invention, the primary winding of the transformer is split into two halves. The DC input voltage is connected (in a corresponding manner to the pulse-width modulated square-wave pulse trains of opposite polarity) in each case to one winding half or to the other, with reverse polarity. It is therefore sufficient, in practice, to have two controlled switches on the primary side.

This object is also achieved using a voltage converter of the type mentioned initially in which, according to the invention, the switching device and the drive circuit are designed to apply two pulse-width modulated square-wave pulse trains of opposite polarity from the DC input voltage to the primary winding. Each pulse train is modulated so as to correspond to one half-cycle of the AC voltage to be generated, and the two pulse trains are shifted with respect to one another such that the pulses of one pulse train fall into the gaps in the other pulse train. A rectifier is connected downstream of the secondary winding of the transformer, at whose output only one pulse train of pulses of one polarity is still present. Owing to their pulse-width modulation, these pulses correspond to successive half-cycles of the AC voltage to be generated. A controlled polarity reversal switch is arranged downstream of the rectifier in order to reverse the polarity of the pulse train downstream of the rectifier at twice the frequency of the AC voltage to be generated, such that a pulse train is obtained which is a pulse-width modulated representation of the AC output voltage with respect to amplitude, frequency and polarity.

The advantages which can be achieved using this voltage converter have already been explained in conjunction with the method.

Here too, it is more appropriate to obtain the AC output voltage from this pulse train using an internal and/or a load-side low-pass filter.

In a preferred embodiment, the primary winding of the transformer is split into two halves, and the switching device has two controlled switches by means of which the DC input voltage can be applied alternately to one winding half and to the other, with reverse polarity. It is advisable, particularly with a resistive load, for the low-pass filter to be formed from an inductance in a series path downstream of the polarity reversal switch and the load.

In practice, for example in the case of loads in the form of motors, the invention provides for the low-pass filter to be at least partially included in an inductive load.

One expedient variant provides for the polarity reversal switch to comprise a bridge circuit which has a controlled switch in each of its four arms.

It is particularly advantageous if the rectifier and the polarity reversal switch are combined in a rectifying switch having a bridge structure, each bridge arm having two back-to-back series-connected diodes, and each diode being bridged by a switching transistor so that, by alternately driving one switching transistor in each bridge arm at twice the system frequency, one and the other diodes of the bridge arm alternately forms the active arm of the bridge, as a result of which the pulse train which is pulse-width modulated with respect to the amplitude, frequency and polarity of the AC output voltage is obtained. In this manner, the secondary-side rectification and switching can take place in a single bridge.

In order to solve the problem of DC isolation, it is favorable if each switching transistor is driven via a light-emitting diode to provide DC isolation.

Cost-effective solutions for relatively large numbers of voltage converters can be achieved if the rectifying switch is in the form of an integrated circuit, thereby simplifying fabrication and reducing manufacturing costs.

BRIEF DESCRIPTION OF THE DRAWINGS

The invention including further advantages is explained in more detail below with reference to exemplary embodiments which are illustrated in the drawing, in which.

DETAILED DESCRIPTION OF THE PREFERRED EMBODIMENTS

Figure 1:
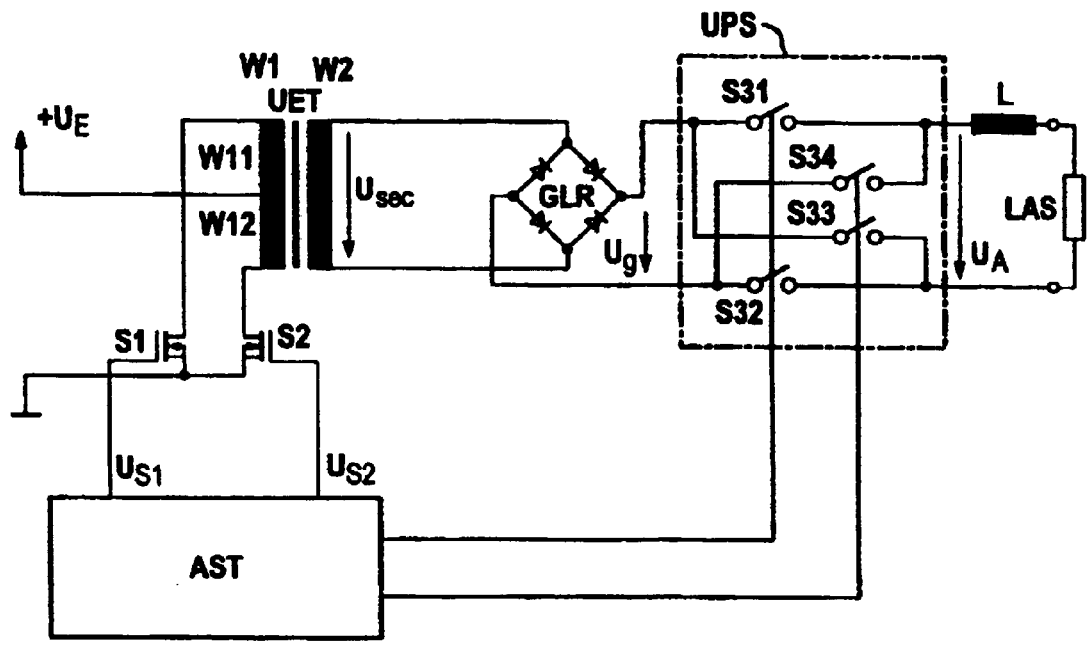
FIG. 1 shows a simplified outline circuit diagram of a voltage converter according to the invention.
Figure 3:
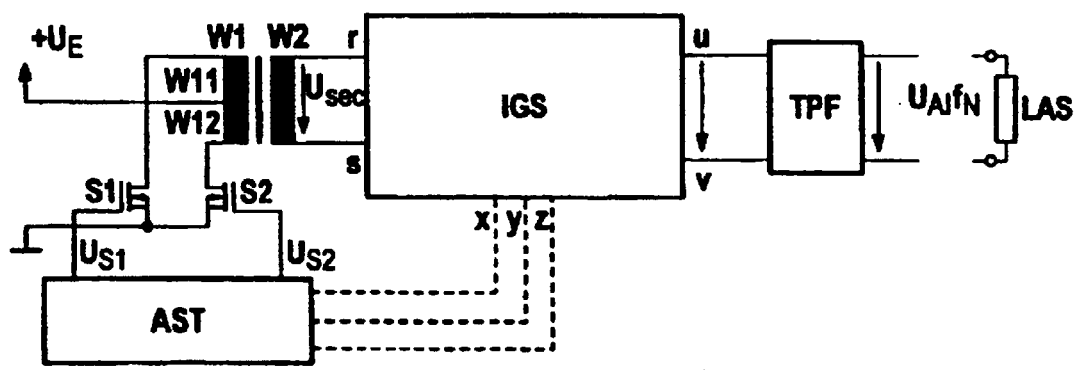
FIG. 3 shows a further circuit for a voltage converter according to the invention.

FIG. 1 shows a transformer UET having a primary winding W1, comprising two winding halves W11, W12, and a secondary winding W2. The positive pole of a DC input voltage $U_E$, for example +12 V, is applied to the center of the primary winding.

Primary winding W1 is connected to the negative pole of the DC input voltage via a first controlled switch S1, connected to the beginning winding half W11, and via a second controlled switch S2, connected to the end winding half W12. The two controlled switches S1, S2, in this case field-effect transistors, can be driven by a drive circuit AST as described in more detail below.

On the secondary side, the secondary winding W2 produces the secondary voltage $U_{sec}$. A bridge rectifier GLR is connected downstream of the winding W2. The GLR is followed by a polarity reversal switch UPS comprising four controlled switches S31 . . . S34. These switches are also controlled by the drive circuit AST, so that firstly S31 and S32 and secondly S33 and S34 are alternately closed or opened. A series inductor L is positioned between the output of the polarity reversal switch UPS and a load connected to the converter.

The method according to the invention will now be explained in more detail with reference to FIGS. 2A–2F.

Two pulse-width modulated square-wave pulse trains of opposite polarity are applied to the primary winding W1, each pulse train being modulated so as to correspond to one half-cycle of the AC voltage to be generated. In this case, the pulses of the two pulse trains are in each case shifted with respect to one another such that the pulses of one pulse train fall into the gaps in the other pulse train.

Figure 2A:
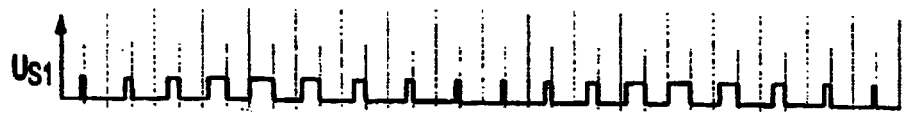
FIGS. 2A–2F show simplified signal waveforms, not to scale, which occur when carrying out the method according to the invention.
Figure 2B:
Figure 2C:
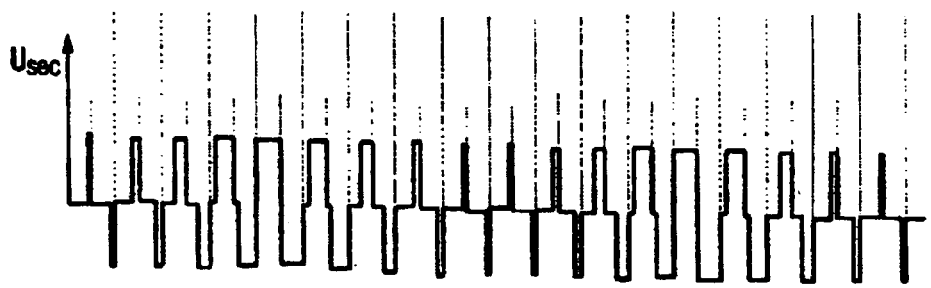
Figure 2D:
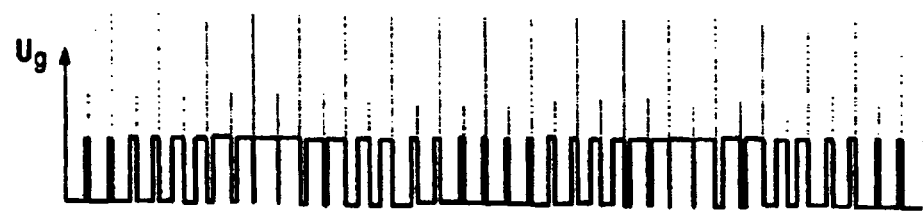
Figure 2E:
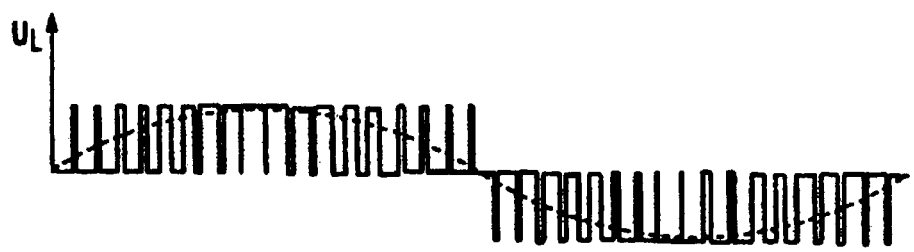
Figure 2F:

FIG. 2F shows the AC output voltage $U_A$ to be generated which is of a frequency of, for example, 50 Hz. FIGS. 2A and 2B show the drive pulses for the two controlled switches S1, S2. FIG. 2C shows the resultant secondary voltage $U_{sec}$ of the transformer, whose waveform also corresponds to that of the primary voltage of the transformer. The opposite polarity of the pulse trains is achieved here by connecting the DC input voltage $U_E$ alternately to one of the two winding halves W11, W12. With an integral primary winding W1, four controlled switches would have to be used to achieve this opposite polarity.

The switching takes place at a higher frequency than the system frequency, for example at 100 kHz, which means that the transformer need have only small dimensions and mass and the secondary-side filtering should have minimal complexity. It is therefore clear that the illustrations shown in FIGS. 2A and 2B should only be regarded as schematic representations since here the switching frequency has been selected to be substantially lower for reasons of clarity.

The combined pulse train shown in FIG. 2C is then rectified using the rectifier GLR, resulting in the pulse train shown in FIG. 2D as the output voltage $U_g$ of the rectifier, this pulse train now having only pulses of one polarity. Since this pulse train now corresponds to successive sinusoidal half-cycles of the output voltage to be generated, the polarity needs to be reversed in time with a frequency which is twice the output frequency, i.e. at 100 Hz. This polarity reversal is done by the polarity reversal switch UPS, so that a voltage $U_L$ as shown in FIG. 2E is generated at the output of the switch UPS. This voltage $U_L$ is a pulse train which is pulse-width modulated with respect to the amplitude, frequency and polarity of the AC output voltage. The desired output voltage is obtained from this voltage $U_L$ after low-pass filtering.

If the load LAS is purely resistive, the low-pass filtering or integration is provided by the series inductance L. With regard to the high clock frequency of 100 kHz or more, in practice special filtering means can be dispensed with since, for example in the case of motor loads, an inductive component is contained in the load, or, on the other hand, for example incandescent lamps have so much inertia that special filtering can be dispensed with.

With reference to FIGS. 3 to 5B, another variant of a voltage converter will now be described in which the rectifier and the polarity reversal switch are combined to form a unit on the secondary side of the transformer, this unit also being in the form of an integrated circuit.

On the primary side of the transformer, the circuit is the same as that shown in FIG. 1. On the secondary side, the secondary winding W2 of the transformer is followed by an integrated rectifier switch IGS and this is followed by a low-pass filter TPF, to whose output the load LAS can be connected.

Figure 4:
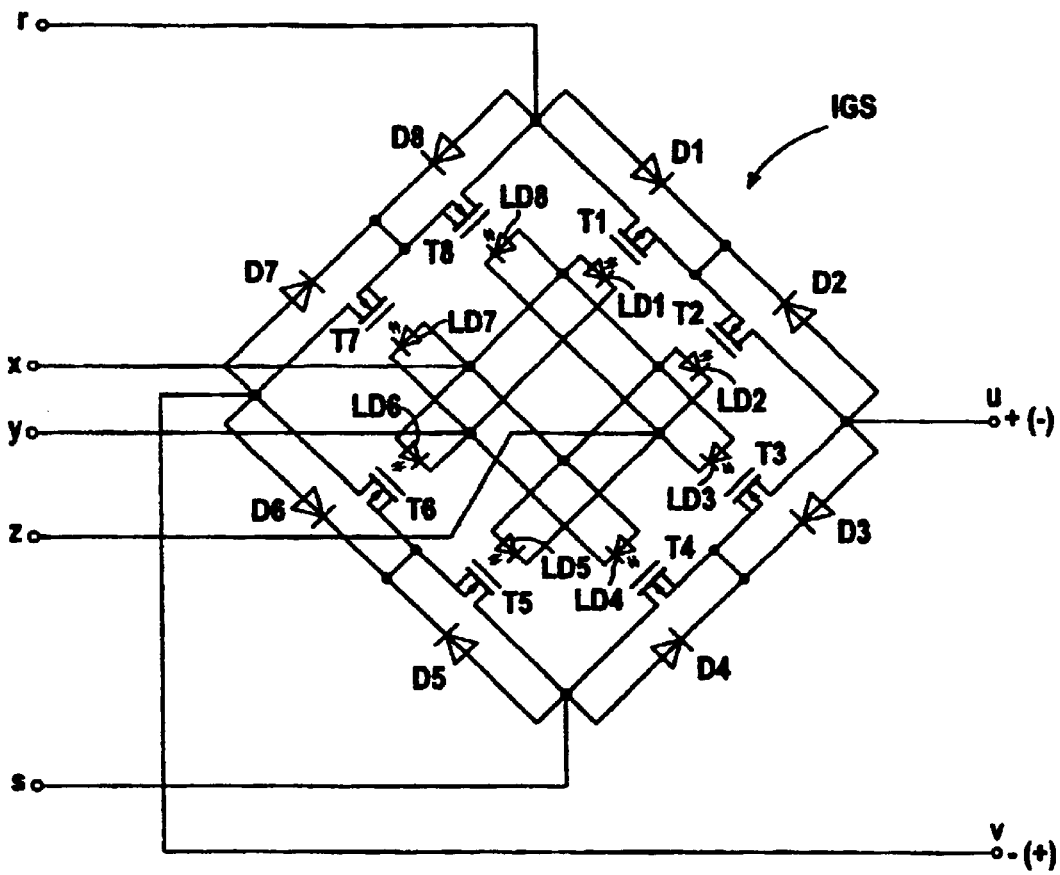
FIG. 4 shows the details of a rectifier switch used in the circuit shown in FIG. 3, and FIGS. 5A and 5B show two switching states of the rectifier switch shown in FIG. 4.

The rectifier switch IGS, whose design is shown in more detail in FIG. 4, is driven by the drive circuit AST at three inputs x, y, z, its inputs being given the reference symbols r and s and its outputs the reference symbols u and v.

As can be seen from FIG. 4, the rectifier switch IGS is in the form of a bridge. Each bridge arm has two back-to-back series-connected diodes D1, D2; D3, D4; D5, D6 and D7, D8. Each diode is bridged by a switching transistor T1 . . . T8. It should be noted here that the diodes can be the parasitic diodes intrinsic to, for example, MOSFET transistors, although the forward-biased voltage drop across the diodes should be kept very low by suitable doping.

Preferably, the transistors T1 . . . T8 are driven with optical DC isolation with the aid of light-emitting diodes LD1 . . . LD8. There is no need for each switching transistor to have an associated light-emitting diode. For example, one light-emitting diode can be used to drive a plurality of transistors which switch simultaneously.

In order to obtain a signal corresponding to the desired sinusoidal output voltage from the rectified pulse-width modulated signal shown in FIG. 2D, the rectifier switch IPS must be switched correspondingly.

The connection "x" is the common anode of the light-emitting diodes on the drive-circuit side, and is connected to the positive supply voltage of the drive circuit AST via a series resistor (not shown).

Figure 5A:
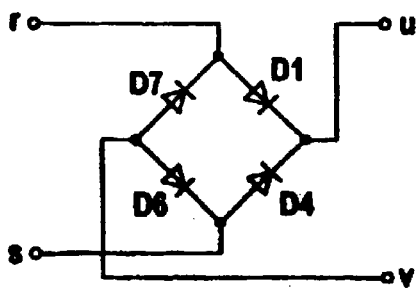

If the connection "z" of the drive circuit is connected to ground, the light-emitting diodes LD2, LD3, LD5 and LD8 are active and the corresponding transistors T2, T3, T5 and T8 are switched on. These switched-on transistors bridge the corresponding diodes D2, D4, D5 and D8 and an equivalent circuit is produced as shown in FIG. 5A. Only the diodes D1, D4, D6 and D7 act as rectified elements and this results in the positive half-cycle having a voltage waveform corresponding to the output voltage $U_A$.

Figure 5B:
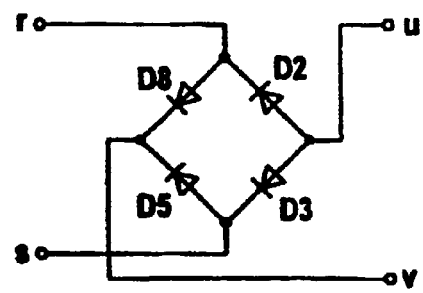

If the connection "y" of a drive circuit is connected to ground, the light-emitting diodes LD1, LD4, LD6 and LD7 are active and the corresponding transistors T1, T4, T6 and T7 are switched on. These switched-on transistors bridge the corresponding diodes D1, D4, D6 and D7 and an equivalent circuit is produced as shown in FIG. 5B. Only the diodes D2, D3, D5 and D8 act as rectifying elements and this results in the negative half-cycle having a voltage waveform corresponding to the output voltage $U_A$.

Since the controlled bridge rectifier is switched at a low frequency, no particularly stringent demands are placed on the switching frequency of the optically coupled switching elements.

The switching must take place at the zero crossing of the AC voltage, but this is known by the drive circuit AST and can be derived from the PWM frequency as an integer division ratio, or is rigidly linked to this frequency.

Although the invention has been described in connection with generation of a single-phase AC voltage, it should be clear to those skilled in the art that appropriate modification also allows the generation of a 3-phase AC voltage, for example.

The AC output voltage will generally be at a frequency of 50 Hz or 60 Hz, although the term "system frequency" should not be taken to mean only these values. Other output frequencies are also possible, for example a system frequency of 400 Hz, as is customary for vehicle electrical systems. The frequency of the output voltage may be switched continuously or in steps, as required.

The sound frequency of the pulse-width modulation is expediently over 20 kHz, preferably in the region of 100 kHz, especially since at such high frequencies the low-pass filtering means are kept to a minimum or can even be completely dispensed with, since this filtering can take place in the load as long as it has, for example, inductive and resistive components. Correspondingly inert loads, such as incandescent lamps, do not require any special low-pass filtering, either.

One major advantage of the invention is that, owing to the pulses which are applied alternately to the positive and negative poles of the primary side of the transformer, saturation and thus thermal losses can be avoided.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for generating an AC output voltage in a frequency range from a DC input voltage, comprising:

pulse-width modulating the DC input voltage at a higher switching frequency than a frequency of the AC output voltage to produce a first pulse train and a second pulse train, wherein the first and second pulse trains are modulated to correspond to one half-cycle of the AC output voltage to be generated, and wherein pulses of the first pulse train are shifted with respect to pulses of the second pulse train, the pulses of the first pulse train occurring during gaps between pulses of the second pulse train;

applying the first pulse train and the second pulse train to a primary winding of a transformer to output from a secondary winding of the transformer a third pulse train having pulses of opposite polarities;

rectifying the pulses of the third pulse train output from the secondary winding of the transformer to generate fourth pulse train having pulses of one polarity and corresponding to successive half-cycles of the AC output voltage to be generated; and periodically reversing the polarity of a plurality of successive pulses of the fourth pulse train at twice the frequency of the AC output voltage to be generated, wherein by periodically reversing the fourth pulse train obtained after rectification, an output pulse train is obtained which is a pulse-width modulated representation of the AC output voltage with respect to the amplitude, frequency and polarity, wherein the rectifying the pulses of the third pulse train and the periodically reversing of the polarity of the plurality of successive pulses of the fourth pulse train are performed by a rectifying switch having a bridge structure, each bridge arm of said bridge structure having two back-to-back series-connected diodes, and each diode being bridged by a switching transistor, wherein one of the switching transistors and an other of the switching transistors in each bridge arm are alternately driven at twice the frequency of the AC output voltage, one of the diodes and an other of the diodes of each bridge arm alternately forming an active arm of the bridge, thereby obtaining the output pulse train which is the pulse-width modulated representation of the AC output voltage with respect to amplitude, frequency and polarity.

2. The method as claimed in claim 1, wherein the primary winding of the transformer is split into two halves, and wherein said applying the first pulse train and the second pulse train to the primary winding of the transformer comprises applying the first pulse train to a first half of the primary winding, and with a reverse polarity, applying the second pulse train to a second half of the primary winding.

3. The method as claimed in claim 1, further comprising: low-pass filtering the output pulse train to obtain the AC output voltage.

4. The method as claimed in claim 3, wherein the primary winding of the transformer is split into two halves, and wherein said applying the first pulse train and the second pulse train to the primary winding of the transformer comprises applying the first pulse train to a first half of the primary winding, and with a reverse polarity, applying the second pulse train to a second half of the primary winding.

5. A voltage converter for converting a DC input voltage into an AC output voltage in a frequency range, comprising:

a drive circuit that drives a first switching device and a second switching device;

a transformer comprising a primary winding and a secondary winding;

the first switching device and the second switching device, each selectively connecting the primary winding to the DC input voltage, said first switching device and said second switching device being driven by said drive circuit to pulse-width modulate the DC input voltage provided to the primary winding at a higher switching frequency than a frequency of the AC output voltage, wherein the first and second switching devices and the drive circuit apply two pulse-width modulated square-wave pulse trains of opposite polarity from the DC input voltage to the primary winding, each pulse train being modulated so as to correspond to one half-cycle of the AC output voltage to be generated, and the two pulse trains being shifted with respect to one another such that the pulses of one pulse train occur during the gaps between pulses in the other pulse train;

a rectifier connected downstream of the secondary winding of the transformer, and outputting only one pulse train of pulses of one polarity, these pulses corresponding to successive half-cycles of the AC output voltage to be generated; and a controlled polarity reversal switch arranged downstream of the rectifier and periodically reversing the polarity of the pulse train downstream of the rectifier at twice the frequency of the AC output voltage to be generated, said controlled polarity reversal switch outputting a pulse train which is a pulse-width modulated representation of the AC output voltage with respect to amplitude, frequency and polarity, wherein said rectifier and said polarity reversal switch are combined in a rectifying switch having a bridge structure, each bridge arm of said bridge structure having two back-to-back series-connected diodes, and each diode being bridged by a switching transistor, wherein one of the switching transistors and an other of the switching transistors in each bridge arm are alternately driven at twice the frequency of the AC output voltage, one of the diodes and an other of the diodes of each bridge arm alternately forming an active arm of the bridge, thereby obtaining the pulse train which is the pulse-width modulated representation of the AC output voltage with respect to amplitude, frequency and polarity.

6. The voltage converter as claimed in claim 5, further comprising a low-pass filter converting the pulse train output by said controlled polarity reversal switch into the AC output voltage.

7. The voltage converter as claimed in claim 6, wherein the low-pass filter is an inductance in a series path downstream of the polarity reversal switch, between the polarity reversal switch and a load.

8. The voltage converter as claimed in claim 6, wherein the low-pass filter is at least partially included in an inductive load.

9. The voltage converter as claimed in claim 5, wherein the primary winding of the transformer is split into two halves, said first switching device selectively connecting a first half of the primary winding to the DC input voltage, and said second switching device selectively connecting a second half of the primary winding to a reverse polarity of the DC input voltage, said first switching device and said second switching device being driven by said drive circuit to alternately connect the first half of the primary winding and the second half of the primary winding to the DC input voltage.

10. The voltage converter as claimed in claim 5, wherein the rectifying switch is an integrated circuit.

11. The voltage converter as claimed in claim 5, wherein each switching transistor is driven via a light-emitting diode, thereby providing DC isolation.

12. The voltage converter as claimed in claim 11, wherein the rectifying switch is an integrated circuit.

13. The voltage converter as claimed in claim 5, wherein said drive circuit, in addition to driving the first switching device and the second switching device, drives said controlled polarity reversal switch, and wherein a switching frequency of the first switching device and the second switching device, as driven by said drive circuit, has a fixed phase angle relative to the system frequency.

* * * * *